Patented Oct. 13, 1942

2,298,915

UNITED STATES PATENT OFFICE 2,298,915

MANUFACTURE OF MODIFIED PRODUCTS FROM FATTY OILS, ETC.

László Auer, East Orange, N. J.

No Drawing. Application March 14, 1941, Serial No. 383,339. In Hungary May 19, 1926

20 Claims. (Cl. 260—407)

This invention relates to the production of modified production of modified products from such materials as fatty oils, fatty acids, esters of fatty acids, waxes and natural and synthetic resins, for example.

In my prior applications more fully identified hereinafter, I have described processes for modifying the properties of organic isocolloids, such as fatty oils, resins, etc., particularly their physical properties such as viscosity, melting point, etc., as well as other properties of these isocolloids. As stated in those applications, the modified organic isocolloids obtained by the processes described therein, are useful for various purposes; the modified products so obtained from fatty oils, resins, etc., being useful and advantageous in making varnishes, lacquers and other liquid and plastic compositions, and in making other useful products, as described in said applications.

The present application, which is a continuation-in-part of my copending prior applications as more fully set forth hereinafter, is directed to certain of the processes described in said prior applications.

This application is a continuation-in-part of my copending prior application Serial No. 446,170, filed April 21, 1930. That application is, in turn, a continuation-in-part of my application Serial No. 143,786, filed October 23, 1926 (Patent 2,189,772) and of the various continuations thereof previously filed by me, particularly Serial No. 359,425, filed April 30, 1929 (Patent 2,213,944). Said Serial No. 143,786 is the parent application of these several prior applications.

The said parent application Serial No. 143,786 and the several continuations thereof, together with the patents which have issued upon the same, are set forth in the following Table A:

Table A

| Serial No. | Filed | Patent No. | Issued |
|---|---|---|---|
| 143,786 | Oct. 23, 1926 | 2,189,772 | Feb. 13, 1940 |
| 273,159 | Apr. 26, 1928 | 1,985,230 | Dec. 25, 1934 |
| 273,160 | Apr. 26, 1928 | 1,985,231 | Dec. 25, 1934 |
| 359,424 | Apr. 30, 1929 | 2,007,958 | July 16, 1935 |
| 359,425 | Apr. 30, 1929 | 2,213,944 | Sept. 10, 1940 |
| 359,426 | Apr. 30, 1929 | 1,980,366 | Nov. 13, 1934 |
| 359,427 | Apr. 30, 1929 | 1,957,437 | May 8, 1934 |
| 446,170 | Apr. 21, 1930 | 2,234,949 | Mar. 18, 1941 |
| 446,171 | Apr. 21, 1930 | 1,980,387 | Nov. 13, 1934 |
| 446,172 | Apr. 21, 1930 | 2,213,943 | Sept. 10, 1940 |
| 446,174 | Apr. 21, 1930 | 2,180,342 | Nov. 21, 1939 |
| 466,587 | July 8, 1930 | 2,106,708 | Feb. 1, 1938 |
| 188,014 | Jan. 31, 1938 | 2,244,666 | June 10, 1941 |
| 236,800 | Oct. 24, 1938 | 2,234,545 | Mar. 11, 1941 |
| 305,409 | Nov. 20, 1939 | 2,293,038 | Aug. 18, 1942 |
| 318,650 | Feb. 12, 1940 | | |
| 356,103 | Sept. 9, 1940 | | |

In my prior applications, listed ante, I have disclosed various methods of modifying organic isocolloid materials using many different modifying agents. As disclosed in those applications, my generic invention relates to processes for the modification of the physical properties of organic isocolloids and to the modified organic isocolloid products that are obtained. By the terms "organic isocolloids" and "organic isocolloid material," I mean organic isocolloid substances wherein the dispersed phase and the dispersion medium of the colloidal system thereof are both of the same chemical composition but in a different physical or colloidal state. That is, such organic isocolloids are mixtures of chemically similar organic compounds wherein one or more of those compounds are dispersed or dissolved in the others which serve as the dispersion medium of these isocolloid systems.

Also, in my said prior applications I have given various illustrative examples of modifying agents that are useful in my processes of modifying organic isocolloid materials. As disclosed in those applications, I have found that by dispersing or dissolving such modifying agents in the organic isocolloid materials, I obtain modified products having altered physical properties, etc., which are useful for various purposes in the commercial or industrial arts. As there disclosed, the modifying agents are employed in minor amounts and are inorganic or organic compounds that contain ions, radicals or residues which are capable of influencing or causing modifications of the organic isocolloid substances.

These modifying agents are "electrolytes" or polar compounds, such as salts of organic and inorganic acids, organic and inorganic acids, metallic derivatives of inorganic compounds etc., as disclosed in my Serial No. 143,786. Also, as disclosed in my Serial No. 359,425 (Patent 2,213,944), the respective organic polar compounds, each comprising within the molecule an acidic inorganic residue and an organic residue, are advantageous modifying agents, in my processes. By an acidic inorganic residue, I mean such an inorganic residue as can be converted by the addition of one or more hydrogen atoms or by the addition of one or more molecules of water, and/or by the action of elevated temperatures into an inorganic acid (including carbonic acid as inorganic), leaving the organic residue behind. It will be seen from the above definition and from the illustrative compounds disclosed in my Ser. No. 359,425, that this generic class of modifying agents includes such compounds as (1) organic halogen derivatives, (2) organic sulfonic acids and their halides and salts, including esters thereof, (3) esters of inorganic acids and (4) inorganic salts of organic bases. Many examples illustrative of each of these classes are given in my said Ser. No. 359,425 (Patent 2,213,944). Some of the modifying agents specifically disclosed in that application are illustrative of other classes of modifying agents that are useful in my processes. That is, they contain a plurality of constituents, groups or radicals which impart polarity to such compounds. For instance, among the specific examples of modifying agents therein disclosed are:

Organic halogen derivatives, e. g.:
    Trichloroacetic acid,
    Chloral hydrate,
    Iodoform,
    o-Dichlorobenzene,
    p-Dichlorobenzene,
    Trichlorobenzene,
    Mono-chloroacetic acid,
    4-chloro-o-anisidine,
    Pinene hydrochloride,
    Naphthalene tetrachloride
    p-Nitro chloro-benzene,
    Benzyl chloride,
    Triphenyl-chloromethane,
    Acetyl chloride,
    Benzoyl chloride.

Organic sulphonic acids and their halides and esters, e. g.:
    Sodium 2:6:8 naphthylaminedisulphonate,
    Sodium 2:6:8 naphtholdisulphonate,
    Sodium 1:8:3:6 aminonaphtholdisulphonate,
    Sodium 1:5 naphtholsulphonate,
    Sodium 2:3:6 naphtholdisulphonate,
    Sodium 2:6 naphtholsulphonate,
    Sodium 2:6 naphthylaminesulphonate,
    Sodium 2:1 naphthylaminesulphonate,
    2-phenylamino-8-naphthol-6-sulphonic acid,
    Beta-naphthylamine 3:6:8 trisulphonic acid,
    Beta-naphthol 3:6:8 trisulphonic acid,
    Beta-naphthol 1:5 disulphonic acid,
    Naphthalene 2:6 disulphonic acid,
    Naphthalene 1 sulphonyl chloride,
    Alpha-naphthyl sulphamic acid,
    m-Xylidine sulphonic acid,
    Benzene sulphonic acid,
    p-Toluene sulphonic acid,
    p-Toluene sulphonyl chloride,
    Sulpho salicylic acid,
    p-Toluidine m-sulphonic acid,
    Benzene sulphonyl chloride,
    2:5 dichlor benzene sulphonic acid,
    Methyl p-toluene sulphonate,
    Aminosalicylic acid,
    Ethyl chlorsulphonate.

Esters of inorganic acids, e. g.:
    Dimethylsulphate,
    Triphenyl or tricresyl phosphate,
    Nitrocresol carbonates.

Inorganic salts of organic bases, e. g.:
    m-Nitroaniline hydrochloride,
    Diaminodiphenylamine sulphate,
    Amino-azo-benzene sulphate,
    Diphenylamine sulphate,
    Diphenylamine hydrochloride,
    Diphenylamine hydrobromide,
    Diphenylamine trichloracetate,
    Trichloraniline hydrochloride.

Further examples are:
    o-Nitrophenol,
    p-Nitrophenol,
    p-Nitro acetanilide,
    Dinitroaniline,
    Fluoresceine,
    Eosin,
    Thiocarbanilide,
    Diamino-diphenyl sulphide,
    Diphenyl sulphone.

In my copending application Ser. No. 446,170, I have described processes of modifying fatty oils and other organic isocolloids, such as resins, etc., in which amine compounds are used as modifying agents. In that application, in addition to the amine compounds disclosed in my prior Ser. No. 359,425 (Patent 2,213,944), I disclosed examples of other amine compounds that are useful as modifying agents in such processes. As stated in said Ser. No. 446,170, certain classes of amine compounds are advantageous in modifying fatty oils, resins and like organic isocolloids. Many specific, illustrative examples of such amine compounds are given in that application, including the following compounds:

Benzidine,
    p-Phenylendiamine,
    Beta-naphthylamine,
    Dianisidine,
    pp-Diamino-diphenylmethane,
    pp-Diaminodiphenylamine,
    pp-Diaminobenzophenone,
    pp-Diaminodiphenyl ether,
    pp-Diaminodiphenyl sulphide,
    Thioaniline,
    pp-Diaminodiphenylurea,
    pp-Diaminodiphenylthiourea,
    m-Phenylenediamine,
    Alpha-naphthylamine,
    Michler's ketone,
    Michler's hydrol,
    Benzylethylanilinesulphonic acid,
    Safranine,
    1:4-diaminoanthraquinone,
    o-Phenylenediamine,
    Diaminodihydroxyanthraquinonedisulphonic acids,
    Diaminotetrahydroxyanthraquinonedisulphonic acids,
    p-Tolylenediamine,
    p-Diaminodimethylcarbazole,
    Eurhodine,
    Diaminodiphenazine,
    Diaminofuchsonimine,
    Phthalamide.

That is, a wide range of amine compounds may be used as the modifying agent in my processes. The specific examples are merely illustrative of those which are advantageous in modifying fatty oils, resins and like organic isocolloids. In practicing this invention, various types of amine compounds may be employed.

Among the applications referred to herein of which the present application is a continuation-in-part, particular reference is made to Ser. Nos. 446,170; 359,425 (patent 2,213,944); 318,650; and 356,103.

In accordance with the present invention, it has been found that such modifying agents as contain a condensed ring system in their molecule have particular additional advantages in treating organic isocolloids of the kind described. The condensed ring system may consist of carbon atoms only, or of carbon atoms and one or more oxygen or nitrogen or sulphur atoms, as particularly described below. Examples of such modifying agents are:

Condensed ring systems in which only carbon atoms form the rings:
    Naphthalene tetrachloride,
    Sodium 2:6:8 naphthylaminedisulphonate,
    Sodium 2:6:8 naphtholdisulphonate,
    Sodium 1:8:3:6 aminonaphtholdisulphonate,
    Sodium 1:5 naphtholsulphonate,
    Sodium 2:3:6 naphtholdisulphonate,
    Sodium 2:6 naphtholsulphonate,
    Sodium 2:6 naphthylaminesulphonate,
    Sodium 2:1 naphthylaminesulphonate,
    2-phenylamino-8-naphthol-6-sulphonic acid,
    Beta-naphthylamine 3:6:8 trisulphonic acid,
    Beta-naphthol 3:6:8 trisulphonic acid,
    Beta-naphthol 1:3 disulphonic acid,
    Naphthalene 2:6 disulphonic acid,
    Naphthalene 1 sulphonyl chloride,
    Alpha-naphthyl sulphamic acid,
    1:4-diaminoanthraquinone,
    Diaminodihydroxyanthraquinonedisulphonic acids,
    Diaminotetrahydroxyanthraquinonedisulphonic acids,
    Pinenehydrochloride.

Examples of a condensed ring where oxygen is present in the ring besides carbon atoms:
    Fluoresceine,
    Eosin.

Compounds where nitrogen forms a part of the condensed ring system besides carbon atoms:
    Safranine,
    p-Diaminodimethylcarbazole,
    Eurhodine,
    Diaminodiphenazine.

With regard to the raw materials which can be used in the methods of the present invention, I may mention the following:

Fatty oils of vegetable and animal origin, including drying, semi-drying and non-drying fatty oils.
    (a) Vegetable oils:
        1. Drying oils
            Linseed oil
            Tung oil
        2. Semi-drying
            Poppyseed oil
            Sunflower oil
            Soya bean oil
            Pine seed oil
        3. Non-drying
            Cottonseed oil
            Corn oil
            Olive oil
            Castor oil
            Rapeseed oil
    (b) Marine-animal oils
        Fish oil (semi-drying)
    (c) Thickened oil
        Linseed stand oil Fatty acids of drying, semi-drying and non-drying fatty oils, advantageously those of drying oils.

Esters of such fatty acids, including esters thereof with polyhydric alcohols, such as glycerol, glycols, etc., or with monohydric alcohols of high molecular weight; artificial oils, waxes and resins particularly those containing esters of acids of drying fatty oils.

Waxes, including vegetable, mineral and animal waxes, such as carnauba, palm or myrtle wax, ozokerite or montan wax, beeswax, wool-wax, sperm oil (liquid wax), spermaceti wax, etc., and other solid and liquid wax-like organic isocolloid materials containing high molecular weight fatty acids or esters thereof with monohydric or dihydric alcohols.

Natural resins, such as gum and wood rosins, copals and other varnish resins of natural origin.

Synthetic resins, particularly those made from or containing rosin and other natural varnish resins, as a component thereof, and those made from or containing the acids of fatty oils and of natural resins and their derivatives such as esters of said acids with glycerine or other polyhydric alcohols, namely ester gum (glycerol rosinates), rosin-modified or drying alkyd resins and like complex synthetic esters of such acids, particularly those containing esters of the acids of drying fatty oils.

The above organic isocolloidal materials may be used with advantage in the present invention to obtain various modified products useful as and in coating compositions. Excellent varnish bases can be readily obtained from the drying fatty oils and resins.

When applying the two step methods that are described in my application Ser. No. 356,103 of September 9, 1940, I can prepare blended mixtures of a modified oil and a modified resin, by using a fatty oil in one step and a resin in the other step. Likewise, blended mixtures of two different types of modified resins or of modified fatty oils can be readily obtained in like manner, using one resin or oil in the first step and another and different oil or resin in the second step and mixing the products.

Also I may use in the present invention other organic isocolloid materials than those mentioned above to obtain modified organic isocolloid products useful as and in coating compositions. Of these isocolloid materials, the following are typical:

Mineral oil fractions, of high molecular weight and of high boiling point, containing substantial amounts, of naphthenic bodies and other unsaturated compounds, such as high boiling fractions of naphthenic oils obtained by distillation or cracking or both, and high boiling naphthenic mineral oil fractions obtained by solvent extraction of mineral oils.

Goudrons or petroleum distillation residues.

Asphalt and asphalt oils.

Tar and tar oils.

Pitches.

Rubber and rubber-like hydrocarbons (synthetic rubbers).

Chemically pure organic isocolloid bodies or materials, such as styrene.

The above organic isocolloid materials are complex hydrocarbon mixtures containing unsaturated carbon compounds, namely compounds containing one or more double bonds or points of unsaturation. They may be used with advantage in the present invention. By using such organic isocolloid materials in the present invention, I obtain modified isocolloid products that are useful as and in coating compositions, particularly plastic compositions.

Many different modified isocolloid products can be obtained from various combinations of organic isocolloid materials mentioned above by using my modifying agents according to the present invention, and a wide variety of products useful in the manufacture of varnishes, linoleum, rubber composition, etc., are thereby obtained. Plastic and liquid coating compositions are easily produced for a variety of industrial applications, by my new two step method.

As explained in those applications, a small percentage by weight of the modifying agent is sufficient in most cases to produce the desired modification. As stated in Ser. No. 446,170, generally 1 to 10 per cent of the modifying agent should be added. But in certain cases satisfactory results may be obtained with less than 1 per cent of the modifying agent. For instance, many varnishes and other compositions containing my modified oils and resins and only a fraction of a per cent of a modifying agent of the condensed ring class, have improved and advantageous properties. And in some cases the percentage of modifying agent may be as low as 0.01 per cent for producing such improved compositions or final products. On the other hand, in other embodiments of this invention I may employ more than 10 per cent of the modifying agent; sometimes as high as 30 per cent. This is advantageous in making greatly modified products and in some cases from 10 to 30 per cent of the modifying agent, usually 20 to 25 per cent, may be used. The greatly modified products so obtained are themselves useful as modifying agents for other organic isocolloids or for more of the same isocolloid, as disclosed in my applications Ser. Nos. 356,103 and 446,172 (Patent 2,213,943). Thus the modified products obtained by the present invention may contain from 0.01 to 30 per cent of a condensed ring compound as the modifying agent.

The use of greatly modified isocolloids as modifying agents is described in Ser. Nos. 446,172 (Patent 2,213,943) and 356,103. If 5% of a greatly modified isocolloid fatty oil, for instance, is added to 100 parts of an untreated fatty oil, and the greatly modified product itself had 5% concentration of a certain modifying agent, the concentration of the modifying agent in the final oil product will be .25%. In case a varnish is made out of this oil by the addition of equal parts of resin compounds to the oil, the concentration of the modifying agent figured on the oil plus resin system, will be as low as .125%.

As disclosed in my Ser. No. 446,170 (and other prior applications), I prefer to add the modifying agent to the starting material in a dry form, (without the presence of water).

In making my modified isocolloid products by the present invention, I employ an amount of a condensed ring compound within the ranges given ante and incorporate the condensed ring compound thoroughly in the organic isocolloid to be modified.

The effectiveness of the modifying agent is appreciably greater when it is applied in the colloidal condition, for example by dispersion in the starting-material by means of some form of mill.

In order to insure complete dissolution or dispersion of the modifying agent in the organic isocolloid, the operation of dissolving or dispersing it, should be carried out under the application of heat. That is, it is advantageous to heat the mixture of organic isocolloid and modifying agent as disclosed in my prior applications. The degree of heat necessary depends upon the nature of the substance under treatment and also upon the modifying agent that is used.

Generally the temperatures employed are sufficient to produce a uniform homogeneous modified product with the particular mixture employed. As stated in my Ser. No. 143,786, the temperatures giving the best results are those above room temperature and below considerably the boiling point of the materials employed, and the organic isocolloid (starting material) and the modifying agent may be melted together, that is, fused into a homogeneous composition.

In general, as disclosed in my prior applications Ser. Nos. 359,425; 318,650; and 446,170, temperatures from 100 to 300° C. give satisfactory results in most cases.

Only occasionally are temperatures above 300° C. necessary to produce satisfactory results. In such cases, higher temperatures may be employed, say as high as 350° C. if necessary. But generally it is desirable to use lower temperatures and this is possible in most cases.

In the case of fatty oils and synthetic resins e. g. which are liquid at room temperature, the modifying agent can be incorporated by a simple mixing. When the condensed ring compound is directly soluble in such liquid starting materials, the mixing and modification can be effected at room temperature. That is, in some cases, the starting material and modifying agent can be mixed cold, as stated in my Ser. No. 143,786. In such cases, the mixture can be subsequently heated to produce further modification of the organic isocolloid if desired.

In general, the temperatures employed in my present processes are below that at which the resultant modified organic isocolloid decomposes and are sufficient to fuse or melt the mixture into a uniform homogeneous modified product. As stated above, temperatures between 100 and 300° C. are advantageous in most cases and are usually employed in my present processes. However, other suitable temperatures may be employed. As stated in my Ser. No. 143,786, the complete dispersion, molecular or colloidal, of the modifying agent in the organic isocolloid material to be treated and modified is important in my processes.

The heat treatment promotes the complete (molecular or colloidal) dissolution of the modifying agent in the substance to be treated. It also facilitates the desired modification. And in some cases it is desirable to continue the heat treatment after the dissolution or dispersion of the modifying agent is substantially complete. In this way further modification of the isocolloid can be obtained, as disclosed in my prior applications.

In those cases where the concentration of the disperse phase of the isocolloid system is high enough, the isocolloid may be melted together with the modifying agent until the melt forms a clear homogeneous mass after cooling. In other cases such as linseed oil, for instance, in which the disperse phase concentration must be increased by a heating process, it is necessary to heat for a longer time to higher temperatures, 250–300° C., in order to bring about the necessary increase of the disperse phase concentration.

If the modifying agent is soluble at a lower temperature in the isocolloid to be treated, such as in linseed oil for example, and it is desirable to obtain a desired effect by heating the reaction mass for a longer period to a higher temperature, it is possible to prepare the product containing the dissolved modifying agent as a first step, and execute the necessary heating process at a later occasion, i. e. in a second step.

The products of the reaction vary in the case of any one definite starting material according to:

(a) Variations made in the nature of the modifying agent.

(b) The percentage of the modifying agent used.

(c) The duration of heating.

(d) The reaction temperature.

(e) The nature, physical state, and pressure of the gas present in the reaction chamber, etc.

The reaction may be further influenced by irradiation with short-wave oscillating energy, ultraviolet rays, X-rays, etc.

As mentioned in my prior application Ser. No. 359,425, the modifying process may be accelerated, not only by radiations but also by making the mixture of starting-material and electrolyte part of an electric circuit.

Likewise, I have found that the presence of air or other gases alters somewhat the results obtained. For instance, the products obtained by heating in the presence of air are somewhat different from those obtained when the mixture is heated in contact with other gases, such as carbon dioxide, nitrogen, hydrogen sulphide, sulphur dioxide, etc., or mixtures of such gases. Rarefication of the gases present in the reaction chamber by the reduction in pressure often tends to intensify their action in my processes.

In my present processes, I may employ a gas treatment in conjunction with the modifying action of the condensed ring compounds. The gas treatment may be carried out by blowing the gas through the reaction mixture or simply by passing it over the mass contained in the reaction chamber. For this purpose I may employ active or inert gases. In doing so, I find that $CO_2$, nitrogen, hydrogen sulphide and $SO_2$ are advantageous. Further, the gas may be produced in situ in the reaction mass by using substances which under the conditions of the reaction develop the desired gas, such, for instance, as carbonates, sulphides, sulphates and the like, all of which develop corresponding gases in the reaction mass.

Also, if desired, the modifying agent may be produced in situ within the mass under treatment.

A small amount, generally not more than 5% of the weight of the starting material, of secondary purely organic metal-free reagents such as aldehydes, phenols, alcohols, ketones, hydrocarbons, etc., may be added with favorable results.

It is further possible to use the above described reagents, i. e., the condensed ring compounds, in combination with any modifying agent described in any one of the above mentioned specifications, e. g. with organic or inorganic acids, with salts, with organo-metallic compounds, with compounds comprising within the molecule an acidic inorganic residue and an organic residue (disclosed in my applications Ser. Nos. 359,425 and 318,650), with amino compounds.

As stated in applications listed above, the application of an electric potential within the reaction mass influences the reaction favorably.

I have further discovered that the dissolution of the modifying agents in the starting-materials may be appreciably facilitated by the addition of certain "auxiliary agents" or "sensitisers." These fall into two groups, namely, the purely inorganic (e. g., silica gel, fuller's earth), and the purely organic, e. g.:

Formaldehyde,
Phenol,
Thiocarbanilide,
Benzidine,
Hexamethylenetetramine,
Alpha-naphthol,
Quinoline,
Pyrogallol,
Benzene,
Glycerol,
Phthalimide.

The specific examples of auxiliary agents here mentioned are to be taken as typical of the substances which have been successfully used for this purpose and not as comprising all the effective substances. It should be mentioned that some electrolytes, and quite a number of the new modifying agents disclosed in the present specification, act as auxiliary agents (sensitisers) when used in conjunction with other modifying agents.

The advantages of a rapid dissolution of the modifying agent are greatest in those cases where a clear, pale or colorless product is desired, especially, for example, for the varnish industry. This is also important in the manufacture of oil products for the rubber industry.

Placticisers may be added to the starting-materials, or they may be added during or after the process of modification, in order to obtain a softer final product. These plasticisers may be purely organic (e. g. glycerol, phenol) or partly organic and partly inorganic (e. g. tricresyl-phosphate).

The uses of the products obtained according to my invention are various, and many of their uses are described in the above mentioned earlier applications. If the reagents used in the reaction are themselves only very slightly soluble in water, most of the oil and resin products give varnishes that have very satisfactory water-resisting properties.

During most of the modification processes described above, the iodine value of the starting material decreases and in the case of fatty oils the saponification value often also decreases and in certain cases the acid value also decreases.

When the modifying agent contains free acid radicals or yields acid on the action of heat, slight increase in acid value and saponification value may also be observed. In most of the cases such increase, however, is of a temporary nature, and longer heating may counteract same.

Products obtained by processes described in the present application may be advantageously vulcanized and used in the vulcanized condition in the rubber trade, especially as rubber substitutes made from modified oil products obtained according to the present process, or in the varnish trade as varnish raw materials, e. g., vulcanized oil products and resin products.

The vulcanization may be advantageously influenced by the use of accelerators, e. g., mercaptobenzthiazole, and/or activators, e. g., zinc oxide. If desired, pigments and/or fillers may be added at any convenient stage.

By the vulcanization of oil-products and resin products I have obtained substances which yield now types of lacquers and varnishes. Various combinations of vulcanized and unvulcanized oil products and resin products may be used. For instance, a resin product may be vulcanized and used with an unvulcanized oil product; a vulcanized oil product may be used with an unvulcanized resin product; a mixture of an oil product and a resin product may be vulcanized together, or a solution of such a mixture in a suitable solvent may be treated with a vulcanizing agent. For the vulcanization sulphur, sulphur chloride or other reagents for introduction of sulphur may be used; with sulphur chloride vulcanization occurs in the cold, and this reagent is also suitable for the vulcanization of solutions of the oil-products or resin-products. The injurious action of free hydrogen chloride evolved when sulphur chloride is used must be prevented by addition of neutralizing agents or other suitable means. For instance an inorganic oxide or hydroxide, e. g., calcium oxide or calcium hydroxide, or an organic amine may be mixed into the modified oil or resin products before vulcanization. Or such neutralising agents may be added to the vulcanizing agent prior to its use. In some cases the vulcanization may be effected prior to the addition of the neutralizing agent. In such cases also the above mentioned agents may be used or the addition of an unsaturated organic substance such as turpentine oil may be found advantageous. The injurious effects of the free hydrogen chloride may also be prevented by passing a gas through the pulverized product or through its solution in a suitable solvent either alone or admixed with or saturated with the vapors of volatile basic substances such as ammonia or trimethylamine or with volatile unsaturated hydrocarbons.

Accelerators, such as:
 Tetramethylthiuram disulphide,
 Heptaldehydeaniline,
 Mercaptobenzthiazole;
Antioxidants, such as:
 p-Aminophenol,
 Hydroquinone, and
 Compounds obtained by condensing alpha and beta naphthylamines or mixtures of these bodies with aldehydes (see Patent 1,777,352);

may be added if desired. Such additions are included in my prior specification as "purely organic bodies". Activators such as zinc oxide may also be added.

The vulcanized products are valuable for varnishes and lacquers, giving films which are very elastic, fast to weathering, and suitable for stoving. After stoving they exhibit a high degree of resilience and hardness. The character of the varnishes and lacquers may be varied by varying the temperature of vulcanization, the proportion of sulphur, the nature and quantity of accelerator and activator, and further by the addition of fillers; e. g. when gas black is applied as a filler the ageing properties of the varnish films are improved accordingly.

The condensed ring compounds mentioned herein are also suitable modifying agents to be used in the process described in my application Ser. No. 359,424 (Patent 2,007,958), wherein in the first instance organic isocolloids are modified or partly modified by treatment with modifying agents and thereafter further transformation is effected by emulsification or dispersion in an aqueous medium with or without the aid of emulsifying or dispersing agents and/or protective colloids. According to the present invention, condensed ring compounds can be used as modifying agents in the first step of this process. Also the products obtained according to the present invention may be subjected to further treatment in the form of aqueous emulsions as in my applications Ser. Nos. 359,424 (Patent 2,007,958) and 361,000 (2,083,549). Condensed ring compounds are also satisfactory modifying agents to be used in the process described in my Ser. No. 359,424 (Patent 2,007,958), wherein the starting material is first emulsified in an aqueous medium and thereafter the emulsion is treated with a small amount of condensed ring compound.

The following examples are given to illustrate the invention specifically. It is to be understood that the invention is not restricted to these examples.

*Example 1 (from Ser. No. 446,170)*

300 parts of linseed oil are treated under vacuum, in a closed kettle, with 20 parts of alpha-naphthylamine. The reaction mass is heated to 280–300° C. and held at that temperature for 5 hours. The product is a very viscous liquid, having modified properties, useful in making varnishes and other protective coatings.

*Example 2 (from Ser. No. 446,170)*

300 parts of linseed oil fatty acids are melted together at 100–250° C., in an open vessel, with 30 parts of beta-naphthylamine, until the product on cooling yields a perfectly homogeneous mass. The viscosity of the resulting product is greater than that of the linseed oil fatty acids used as starting materials. The product may be used in plastics, plastic coating compositions or as modifying agent of other isocolloids, being itself a "greatly modified" product. It may be melted, cooked, or fused with other oils or resins to form useful coating compositions and other products, useful in the arts.

*Example 3 (from Ser. No. 318,650)*

100 parts of rapeseed oil and 5 parts of sodium naphthalene monosulphonate are heated in a vacuum for two hours to 300–350° C. The modified oil product is used as bodied oil in the coating arts.

*Example 4 (from Ser. No. 318,650)*

This example illustrates the use of the acid, in lieu of the salt thereof, in the procedure of Example 3, as set forth also in Ser. No. 143,786.

To 100 parts of rapeseed oil are added 5 parts of naphthalene sulphonic acid and the mixture is heated in a vacuum for two hours to 300° C. The product is useful in coating compositions. As rapeseed oil is a non-drying oil, the products of Examples 3 and 4 are primarily suitable in formulating lacquers and form suitable plasticizers in many kinds of lacquer coatings or plastics. When vulcanized with sulphur, they form rubber compounding ingredients, useful in the arts.

In Examples 3 and 4, instead of heating the mixture under vacuum, i. e. under reduced pressure, the mixture may be heated under increased pressure (above atmospheric pressure) or at atmospheric pressure, as also disclosed in Ser. No.

143,786. Likewise, as disclosed in that application, other oils may be used in lieu of rapeseed oil, such as linseed oil. Other examples of useful oils are castor oil, soybean oil, fish oils. Other condensed ring compounds may be used in the above examples. Some of them are illustrated in the examples further below.

Example 5

100 parts of linseed oil and 5 parts of naphthalene 2:6 disulphonic acid were heated to a glass lined vacuum autoclave, which had a glass protected agitator as part of the equipment. The reagent was added when the temperature of the oil reached 130–140° C. Because of frothing, the heating was temporarily suspended. The temperature dropped to 90° C., when the remainder of the reagent was added. The kettle was closed and vacuum and heat were applied again. There was occasional frothing while the temperature was rising to 130° C. After this temperature was reached, no further trouble occurred. The temperature was increased to 290–300° C. in 2 hours and the mixture was kept at this temperature for 4 hours. The heat was then turned off, and the mass was allowed to stand overnight and was reheated next morning for another 2½ hours to the reaction temperature of 290–300° C. The product was cooled to 100° C. and poured into containers. A very viscous mass resulted which was useful as a varnish base and as an intermediate for vulcanized oil products, to be used in rubber mixes. During the heating the vacuum was maintained at 20–24", and too strong distillation was prevented by corresponding lowering of the vacuum.

Example 6

300 parts of rosin and 15 parts of beta-naphthol 3:6:8 trisulphonic acid were heated in an open kettle for 5 hours to 280–300° C. It took 40 minutes to reach this reaction temperature. The color darkened during the reaction. The mass did not froth. Some of the reagent remained undissolved. The product yielded a hard, brittle dark brown solid, useful as varnish base.

Example 7

Example 6 was repeated under vacuum of 8–28". The temperature was kept at 280–310° C. for 5 hours. The color of the product was lighter than the product of Example 6. The properties of the resulting resin were similar to the product of Example 6.

Example 8

300 parts of linseed oil and 15 parts of 1:4 diamino anthraquinone were heated under vacuum in 20 minutes to 290° C. and kept for 5 hours between 290 and 310° C. The modifying agent dissolved below 200° C., darkening the color of the oil. Some boiling occurred at 200° C. The resulting product was a very sticky, elastic brown solid, after cooled to room temperature.

Other anthraquinone derivative useful in the present process are e. g. isomers of 1:4 diamino anthraqinone, 1-amino anthraquinone, 2-amino anthraquinone, the various isomeric diaminodihydroxyanthraquinone-disulphonic acids, the diaminotetradroxyanthraquinone - disulphonic acids, anthraquinone alpha-sulphonic acid, anthraquinone beta-sulphonic acid, anthraquinone 1:5 disulphonic acid, anthraquinone 2:6 disulphonic acid, beta-chloro-anthraquinone, nitro anthraquinone amongst others. They may replace 1:4 diamino-anthraquinone in the above examples, yielding similar, but individually different products. The alkali resistance of films obtained of finishes, containing the products of this example has to be noted. The products may be used themselves as modifying agents, by blending them with other oils and resins, useful in the coating arts, or in plastics.

Example 9

300 parts of linseed oil, and 15 parts of safranine were heated under vacuum in 20 minutes to 285° C. Temperature was maintained between 290 and 310° C. for 5 hours. Frothing occurred at 130° C. and subsided at 210° C., after which gentle boiling set in. The modifying agent dissolved between 100 and 200° C., darkening the color of the oil. The reaction product was a viscous dark oil, useful in coating compositions, etc.

Example 10

300 parts of linseed oil and 15 parts of alphanaphthylamine were treated according to the process described in Example 9. The vacuum was maintained between 15 and 26 inches. The product is a soft, brown, pasty solid. When beta-naphthylamine was used in this example instead of the alpha-naphthylamine, the product had a green fluorescence and resulted in a thick brown oil.

Example 11

300 parts of linseed stand oil (heat bodied linseed oil) and 15 parts of naphthalene-1-sulphochloride were heated according to the process of Example 9. The product was then transferred into a varnish kettle and 150 parts of lime-hardened rosin was added. The oil and resin were heated to 210° C., cooled and thinned, with mineral spirits. Cobalt naphthenate drier was added, in the proportion of .03% cobalt metal to 100 parts of oil. The resulting varnish dried, when brushed out on metal in 30 hours to a print-free stage.

When the H-salt was used as the modifying agent in Example 11, the varnish dried in 10 hours, and when beta-naphthol 3:6:8 trisulphonic acid was used the varnish dried in 7½ hours. Pinene hydrochloride yielded a varnish, which became print-free after 8 hours. Zinc oxide paints made out of the last mentioned varnishes, dried between 6 to 8 hours to a print-free stage, i. e. completely through.

Example 12

100 parts of linseed oil and 5 parts of fluorescein are heated in a closed container under vacuum of 29 inches. The modifying agent dissolves at low temperatures, however, incompletely. Reaching 80° C. the temperature suddenly rises to 160° C., accompanied by heavy frothing. This is caused by a moderate exothermic reaction. The froth subsides at 200° C. and some gas evolution occurs. After one hour at 300° C. the oil begins to thicken and after four hours heating at this temperature it is almost solid in the kettle.

Continuing the heating the product begins to melt again and after five hours of total heat at 300° C. it is cooled and poured off. The product is a thick sticky oil of a golden brown color with green fluorescence.

When this example was repeated with castor oil a thin, dark, reddish brown oil was obtained.

*Example 13*

Example 12 was repeated in an open kettle at atmospheric pressure, using linseed oil as raw material. After five hours heating between 290° and 300° C. a brown, elastic jelly was obtained with a strong green fluorescence.

In Examples 12 and 13 many other modifying agents may be used. Beta-naphthol 3:6:8 sulphonic acid and H-salt yield fast-drying varnishes. Beta-oxynaphthoic acid, L-salt and beta-naphthol 1:5 disulphonic acid yield light colored products. Other examples are Tobias acid, Broenner's acid, amino-2, 3:6:8 trisulphonic acid, amido-G-salt, G-salt, amongst others.

*Example 14*

Whereas, profound changes in physical properties of fatty oils need modifying agents in quantities of 1% or over, gradual changes of properties such as bodying velocity of oils may be influenced with smaller proportions of modifying agent than 1%. To demonstrate this fact a series of experiments have been carried out with linseed oil adding up to 200 parts of oil to one part of modifying agent. The mixture was heated at atmospheric pressure in open containers to 295° to 305° C. and kept at that temperature for five hours. A blank experiment was carried out with linseed oil alone without any modifying reagent. The resulting oils were checked for viscosity and color. Further, a standard testing varnish formula was prepared from all of the oils as follows: 2 parts of oil product and 1 part of ester-gum were heated to 300° C. and kept at that temperature for one hour. The mixture was cooled to 200° C. and thinned with 3 parts of mineral spirits to 50% solids. Naphthenate driers were added in the proportion of .03% cobalt metal, .02% manganese metal and .30% lead metal based on the quantity of oils used. The varnishes were stored for two days, then panels of steel were coated with a coating knife yielding .003 of an inch heavy films. The drying of the varnishes was observed and compared with each other, as well in the initial stage (first 5 hours), as also after overnight drying. The dry panels were left to through-dry for 48 hours and then the panels were tested for cold water resistance, boiling water resistance and alkali resistance. The cold water resistance was tested by immersing the panels for 24 hours in cold water and comparing the appearance of the film. The boiling water test was carried out by immersing the films into boiling water for 15 minutes and comparing the results. The degree of milkiness and softness of films was observed, together with the speed with which the milky films returned to their original appearance on air drying.

The alkali resistance was tested in 3% sodium hydroxide solution, by immersing the panels into same and noting the time when the alkali completely attacked and dissolved the films. All immersion tests were made in such a way that ½ of the panels remained unimmersed for comparative purposes. The results of the observations are summarized in the attached table:

| Reagent | Color of oil | Viscosity of oil | Color of varnish | Viscosity of varnish |
| --- | --- | --- | --- | --- |
| None | 1 | 13 | 4 | 13 |
| Oxyquinoline sulphate | 7 | 15 | 2 | 16 |
| Alpha-nitroso-beta-naphthol | 9 | 12 | 12 | 9 |
| Fluorescein | 5 | 10 | 9 | 15 |
| Anthraquinone beta-sulphonic acid | 10 | 7 | 13 | 6 |
| Naphthol-1-3:8 disulphonic acid | 4 | 16 | 5 | 12 |
| Naphthylamine 1-sulphonic acid-4 | 3 | 14 | 3 | 14 |
| Amino-G-acid | 16 | 6 | 11 | 7 |
| 2-amino anthraquinone | 13 | 3 | 14 | 4 |
| 1-naphthylamine-3:6:8 sulpho acid | 12 | 11 | 1 | 10 |
| Beta-chloro-anthra-quinone | 11 | 2 | 8 | 2 |
| Nitro-anthraquinone | 15 | 1 | 16 | 3 |
| 1-aminoanthraquinone | 14 | 4 | 15 | 1 |
| Anthrahydroquinone-diacetate | 2 | 8 | 7 | 8 |
| Naphthalene tetrachloride | 6 | 9 | 10 | 5 |
| Naphthalene-beta-sulphonyl chloride | 8 | 5 | 6 | 11 |

| Reagent | Drying properties of varnish | | Cold water resistance | Boiling water resistance | Alkali resistance (3% alkaline) |
| --- | --- | --- | --- | --- | --- |
| | Initial drying | Overnight tack-freeness | | | |
| None | F | F | F | B | 5 hrs. 15 mins. |
| Oxyquinoline sulphate | S | S | F | F | Overnight. |
| Alpha-nitroso-beta-naphthol | F | F | F | F | 6 hrs. |
| Fluorescein | VG | VG | VG | VG | Overnight. |
| Anthraquinone beta-sulphonic acid | VG | VG | F | B | Do. |
| Naphthol-1-3:8 disulphonic acid | F | G | G | G | 3 hrs. 15 mins. |
| Naphthylamine-1-sulphonic acid-4 | G | F | F | B | 4 hrs. 15 mins. |
| Amino-G-acid | VG | VG | G | G | 6 hrs. 15 mins. |
| 2-amino anthraquinone | VG | VG | F | B | 5 hrs. 15 mins. |
| 1-naphthylamine-3:6:8 sulpho acid | VG | VG | G | G | Overnight. |
| Beta-chloro-anthraquinone | F | VG | G | VG | 5 hrs. |
| Nitro-anthraquinone | G | G | G | VG | Overnight. |
| 1-aminoanthraquinone | G | G | VG | VG | Overnight (best). |
| Anthrahydroquinone-diacetate | VG | VG | F | VG | 3 hrs. |
| Naphthalene tetrachloride | VG | VG | G | F | 3 hrs. |
| Naphthalene-beta-sulphonyl chloride | G | G | G | F | 7 hrs. |

ABBREVIATIONS.—VG=very good; G=good; F=fair; S=slow; B=bad.

KEY.—In comparing colors #1 is the lightest of the series and #16 is the darkest. In comparing viscosities #1 is heaviest and #16 thinnest of series.

NOTE.—The oils having viscosity numbers 1, 2, 3 and 4 gelled during preparation and the order relates to the stiffness of the gelled oil. In making the varnish the gel liquefied.

*Example 15*

Instead of using sodium salts of sulphonic acids, other metal salts such as barium salts, for example, may be used. Example 3 has been repeated by using the barium salt instead of the sodium salt.

Wherever in this specification and in the claims fatty oils are mentioned, they are meant to include in general polyhydric alcohol esters of the fatty acids occurring in fatty oils, whether said esters are natural or synthetic.

What is claimed is:

1. In the manufacture of bases for coating materials from fatty oils, the improved process which comprises mixing 100 parts of a fatty oil with not more than 10 parts of an organic cyclic compound containing a condensed ring system in the molecule and capable of modifying the physical properties of the oil, and thoroughly dispersing said condensed ring compound throughout the oil, thereby modifying its properties in forming coating compositions.

2. The process of claim 1, wherein the dispersion of the condensed ring compound is facilitated by heating the mixture to temperatures exceeding 100° C.

3. The process of claim 1 wherein the dispersion of the condensed ring compound is facilitated by heating the mixture to temperatures between 250° and 300° C.

4. The process of claim 1 wherein the condensed ring compound contains at least one substituent of a hydrogen atom.

5. The process of claim 1 wherein the condensed ring compound is an anthracene derivative.

6. The process of claim 1, wherein the condensed ring compound is a substituted anthraquinone.

7. The process of claim 1, wherein the condensed ring compound is an anthraquinone compound containing at least one substituent of a hydrogen atom.

8. The process of claim 1, wherein the condensed ring compound is an inorganic radical substituted anthraquinone.

9. The process of claim 1 wherein the condensed ring compound is a naphthalene derivative.

10. The process of claim 1 wherein the fatty oil to be modified is a member of the class of drying and semi-drying oils.

11. The process of claim 1 wherein the oil to be modified is linseed oil.

12. The process of claim 1, wherein the condensed ring compound contains at least three rings.

13. The process of claim 1, wherein the condensed ring compound contains at least one hydroxy-substituent of a hydrogen atom.

14. The process of claim 1, wherein the condensed ring compound contains at least one sulpho-substituent of a hydrogen atom.

15. The process of claim 1, wherein the condensed ring compound contains at least one amino-substituent of a hydrogen atom.

16. The process of claim 1, wherein the condensed ring system is a substituted anthraquinone containing at least one hydroxy-radical.

17. The process of claim 1, wherein the condensed ring system is a substituted anthraquinone containing at least one sulpho-radical.

18. The process of claim 1, wherein the condensed ring system is a substituted anthraquinone containing at least one amino radical.

19. The process of claim 1, wherein the fatty oil to be modified is a drying oil.

20. The process of claim 1, wherein the fatty oil to be modified is a semi-drying oil.

LÁSZLÓ AUER.

CERTIFICATE OF CORRECTION.

Patent No. 2,298,915.                                                            October 13, 1942.

LÁSZLÓ AUER.

It is hereby certified that error appears in the printed specification of the above numbered patent requiring correction as follows: Page 1, first column, line 2, strike out "modified production of"; page 6, first column, line 3, for "now" read --new--; page 7, first column, line 12, for "to a" read --in a--; line 74, for "diaminotetradroxyanthraquinone" read --diaminotetrahydroxyanthraquinone--; and that the said Letters Patent should be read with this correction therein that the same may conform to the record of the case in the Patent Office.

Signed and sealed this 22nd day of December, A. D. 1942.

(Seal)
Henry Van Arsdale,
Acting Commissioner of Patents.